(12) United States Patent
Liu et al.

(10) Patent No.: US 12,545,812 B2
(45) Date of Patent: *Feb. 10, 2026

(54) CERAMIFIABLE COMPOSITION, CERAMIFIABLE ARTICLE, AND METHOD OF MAKING THE SAME

(71) Applicant: 3M INNOVATIVE PROPERTIES COMPANY, St. Paul, MN (US)

(72) Inventors: Junkang Jacob Liu, Woodbury, MN (US); Pingfan Wu, Woodbury, MN (US); Jose Maria Benito, Madrid (ES)

(73) Assignee: 3M Innovative Properties Company, St. Paul, MN (US)

( * ) Notice: Subject to any disclaimer, the term of this patent is extended or adjusted under 35 U.S.C. 154(b) by 469 days.

This patent is subject to a terminal disclaimer.

(21) Appl. No.: 18/118,926

(22) Filed: Mar. 8, 2023

(65) Prior Publication Data

US 2023/0365837 A1 Nov. 16, 2023

Related U.S. Application Data

(60) Provisional application No. 63/341,246, filed on May 12, 2022.

(51) Int. Cl.
| | | |
|---|---|---|
| *C09J 7/25* | (2018.01) | |
| *C09J 7/38* | (2018.01) | |
| *C09J 11/04* | (2006.01) | |
| *H01M 50/595* | (2021.01) | |

(52) U.S. Cl.
CPC . *C09J 7/25* (2018.01); *C09J 7/38* (2018.01); *C09J 11/04* (2013.01); *H01M 50/595* (2021.01); *C09J 2203/33* (2013.01); *C09J 2301/302* (2020.08); *C09J 2301/41* (2020.08); *C09J 2483/00* (2013.01); *C09J 2483/006* (2013.01)

(58) Field of Classification Search
None
See application file for complete search history.

(56) References Cited

U.S. PATENT DOCUMENTS

| | | | |
|---|---|---|---|
| 6,084,002 | A | 7/2000 | Nicholson et al. |
| 8,409,479 | B2 | 4/2013 | Alexander et al. |
| 8,541,126 | B2 | 9/2013 | Hermann et al. |
| 9,160,038 | B2 | 10/2015 | Buck et al. |
| 9,359,529 | B2 | 6/2016 | Liu et al. |
| 9,536,635 | B2 | 1/2017 | Polasky |
| 9,676,941 | B2 | 6/2017 | Van Eibergen et al. |
| 10,236,098 | B1 | 3/2019 | Li et al. |
| 10,501,597 | B2 | 12/2019 | O'Neil et al. |
| 10,857,758 | B2 | 12/2020 | Doi et al. |
| 2006/0004169 | A1 | 1/2006 | Sherwood, Jr. et al. |
| 2012/0308871 | A1* | 12/2012 | Pascaly ............... H01M 50/423 428/140 |
| 2018/0057652 | A1 | 3/2018 | Irie |
| 2018/0290918 | A1* | 10/2018 | Benito López ......... C03B 32/02 |
| 2019/0218425 | A1 | 7/2019 | Schwartz et al. |
| 2020/0062920 | A1 | 2/2020 | O'Neil et al. |
| 2021/0284841 | A1 | 9/2021 | Zhang et al. |
| 2023/0369694 | A1* | 11/2023 | Liu ................... C04B 35/5603 |

FOREIGN PATENT DOCUMENTS

| | | |
|---|---|---|
| CN | 102618040 B | 10/2013 |
| CN | 106349711 A | 1/2017 |
| CN | 110641101 A | 1/2020 |
| EP | 2350220 B2 | 2/2020 |
| JP | 2003505262 A | 2/2003 |
| WO | 2019230179 A1 | 12/2019 |
| WO | 2021035460 A1 | 3/2021 |
| WO | 2021163826 A1 | 8/2021 |
| WO | 2021163827 A1 | 8/2021 |
| WO | 2021176372 A1 | 9/2021 |
| WO | 2022023902 A1 | 2/2022 |
| WO | 2022023903 A1 | 2/2022 |
| WO | 2022023908 A1 | 2/2022 |
| WO | 2022069968 A1 | 4/2022 |
| WO | 2022133780 A1 | 6/2022 |
| WO | 2022133783 A1 | 6/2022 |
| WO | 2022146867 A1 | 7/2022 |

OTHER PUBLICATIONS

"Standard Test Method for Monotonic Compressive Strength of Advanced Ceramics at Ambient Temperature", ASTM C1424-15, 2022, pp. 1-13.
"Standard Test Method for Tensile Properties of Thin Plastic Sheeting", ASTM, D882-18, 2022, pp. 1-12.
Andrianov, "The Hydride Addition of Organohydrosiloxanes to Compounds with a Multiple Carbon-Carbon Bond", Russian Chemical Reviews, 1979, vol. 48, No. 7, (Translated from UspekhiKhimii, 48, 1233-1255, 1979), pp. 657-668.
Anyszka, "Effect of mineral filler additives on flammability, processing and use of silicone-based ceramifiable composites", Polymer Bulletin, 2018, vol. 75, pp. 1731-1751.
Dar, "Thermally Activated Pressure-Sensitive Adhesives", Journal of Adhesion Science And Technology, 2007, vol. 21, No. 16, pp. 1645-1658.

(Continued)

*Primary Examiner* — Anish P Desai
(74) *Attorney, Agent, or Firm* — Bradford B. Wright

(57) ABSTRACT

A ceramifiable composition comprises a crosslinked silicone matrix retaining stabilizing components. The stabilizing components comprise subcomponents: a) at least one of an aluminosilicate clay, aluminum oxide, or a hydrate thereof; b) at least one of phosphorus pentoxide, a polyphosphate, an inorganic phosphate salt, boron oxide, boric acid or a salt thereof; and c) at least one of an alkaline earth oxide, alkaline earth carbonate, or a hydrate thereof, and wherein heating the ceramifiable composition to a temperature between 600 and 1600 degrees Celsius, inclusive, results in a ceramified composition. An article including a layer of the ceramifiable composition and a method of making the same are also disclosed.

20 Claims, 1 Drawing Sheet

(56) References Cited

OTHER PUBLICATIONS

Gong, "Improved self-supporting property of ceramifying silicone rubber composites by forming crystalline phase at high temperatures", Journal of Alloys and Compounds, Jun. 2017, vol. 706, pp. 322-329.
Kuciński, "Silylation Of Silanols With Hydrosilanes Via Main-Group Catalysis: The Synthesis Of Unsymmetrical Siloxanes And Hydrosiloxanes", Inorganic Chemistry, 2020, vol. 07, pp. 4190-4196.
Li, "Polymer-Based Ceramifiable Composites For Flame Retardant Applications: A Review", Composites Communications, 2020, vol. 21, pp. 1-18.
Liu, "Structure and Properties of Closed-Cell Foam Prepared From Irradiation Crosslinked Silicone Rubber", Journal of Applied Polymer Science, 2009, vol. 113, pp. 3590-3595.
Lou, "Preparation and properties of ceramifiable flame-retarded silicone rubber composites", Journal of Thermal Analysis and Calorimetry, May 2017, vol. 130, pp. 813-821.
Palsule, "Gamma Irradiation of Silicones", Journal Of Inorganic Organomet Polymer, 2008, vol. 18, pp. 207-221.
S. C. Shit, "A Review on Silicone Rubber", National Academy of Science Letters, Aug. 2013, vol. 36, No. 4, pp. 355-365.
Song, "Thermal Decomposition and Ceramifying Process of Ceramifiable Silicone Rubber Composite with Hydrated Zinc Borate", Materials, 2019, Vo. 12, 1591, 15 pages.
Technical Paper: "Silicone Material Solutions for Battery Fire Protection", The Dow Chemical Company, 2021, 7 pages.
Wang, "A General Method To Synthesize And Sinter Bulk Ceramics In Seconds", Science, 2020, vol. 368, pp. 521-526.

\* cited by examiner

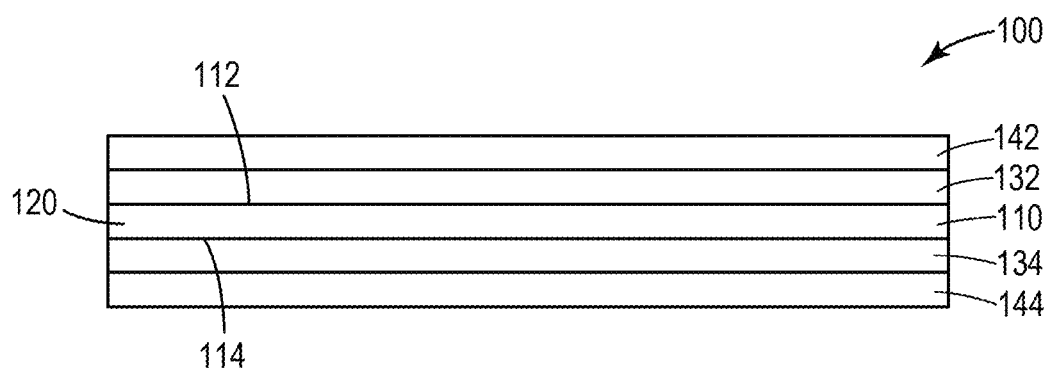

CERAMIFIABLE COMPOSITION, CERAMIFIABLE ARTICLE, AND METHOD OF MAKING THE SAME

CROSS REFERENCE TO RELATED APPLICATIONS

This application claims priority from U.S. Provisional Application Ser. No. 63/341,246, filed May 12, 2022, the disclosure of which is incorporated by reference in its/their entirety herein.

BACKGROUND

With the benefits of reduced emissions and fuel cost savings, electric vehicle drivetrains are rapidly displacing traditional internal combustion engines in the transportation sector. As these technologies are developed and scaled up, use of rechargeable batteries to power these drivetrains has greatly expanded, with some battery assemblies containing thousands of individual cells. The evolution of this technology has raised technical challenges around managing risks associated with these high voltage and high current devices in automotive vehicles.

Battery assemblies are generally governed by a battery management system that ensures that a battery is working within a specified nominal range of operating and environmental factors, including charge and discharge currents, cell voltage, and temperature. Common battery assemblies operate best in a relatively narrow operating range for temperature, generally in the range of from about 15° C. to about 45° C. Outside of this range, the functional safety, service life, and cycle stability of the battery assembly can be compromised. If the temperature exceeds a critical level, thermal runaway may occur. Thermal runaway typically occurs as a result of a chain reaction in individual cell(s), where temperatures exceeding 700° C. can lead to decomposition of battery components, gas formation, and ignition of the cell(s). Such thermal runaway (which may include fire) can quickly spread across many cells in the battery assembly.

One of the primary causes of thermal runaway is an internal short circuit within the battery assembly. Short circuits can occur as a result of separators within an individual cell wearing out, melting, or otherwise suffering damage. To avoid this, battery assemblies contain many layers of insulation within the housing of the battery to electrically isolate electrical conductors within the battery from inadvertently contacting each other or the outside casing of the battery assembly, which is commonly made from metal. These materials also help avoid low current leakage which can induce undesirable self-discharge in the battery.

Battery assemblies also typically include battery packaging materials securing individual cells in place and protecting them from mechanical abuse caused by vibration, minor impacts, or battery expansion/contraction during charge and discharge.

SUMMARY

It would be desirable to have battery packaging materials that can function both as a cushioning/damping packaging material under battery normal operating conditions and also as a flame/thermal barrier isolating affected cells if a thermal runaway event occurs. Advantageously, the present disclosure provides such materials in the embodiment of flexible ceramifiable materials that serve as a flexible electrical and/or thermal insulators and resilient cushioning material that may be placed under the lid, on the bottom, between modules in a battery pack, or even between neighboring cells in a battery pack.

The flexible silicone-based ceramifiable compositions described herein not only provide electrical resistance and a relatively high dielectric breakdown voltage at normal battery operating temperatures, but also can be converted to ceramic if subjected to extreme thermal conditions (e.g., thermal runaway), which provides excellent thermal/fire barrier protection within a battery pack assembly. As a further advantage, these polymeric materials can be made resiliently compressible and conformable to fill complex and irregular enclosures within a battery pack assembly. Overall, these beneficial properties can enable these materials to be easily installed as a resilient cushion thermal barrier isolator to mitigate the problem of battery fires.

In a first aspect, the present disclosure provides a ceramifiable composition comprising a crosslinked silicone matrix retaining stabilizing components, wherein the stabilizing components comprise subcomponents:
    a) at least one of an aluminosilicate clay, aluminum oxide, or a hydrate thereof;
    b) at least one of phosphorus pentoxide, a polyphosphate, an inorganic phosphate salt, boron oxide, boric acid, a boric acid salt, or a hydrate thereof; and
    c) at least one of an alkaline earth oxide, alkaline earth carbonate, or a hydrate thereof, and wherein heating the ceramifiable composition to a temperature between 600 and 1600 degrees Celsius (° C.), inclusive, results in a ceramified composition.

In a second aspect, the present disclosure provides a ceramifiable article comprising a layer of a ceramifiable composition according to the present disclosure, wherein the layer has first and second opposed major surfaces.

In yet another aspect, the present disclosure provides a method of making a ceramifiable composition, the method comprising sequentially:
    blending at least a crosslinkable silicone and stabilizing components to provide a blended mixture, wherein the stabilizing components comprise subcomponents:
        a) at least one of an aluminosilicate clay, aluminum oxide, or a hydrate thereof;
        b) at least one of phosphorus pentoxide, a polyphosphate, an inorganic phosphate salt, boron oxide, boric acid, a boric acid salt, or a hydrate thereof; and
        c) at least one of an alkaline earth oxide, alkaline earth carbonate, or a hydrate thereof;
    disposing the blended mixture on a carrier; and
    exposing the blended mixture to high energy radiation to provide a ceramifiable composition comprising a crosslinked silicone matrix retaining the stabilizing components, wherein heating the ceramifiable composition to a temperature between 600 and 1600° C., inclusive, results in a ceramified composition.

As used herein:

The term "ceramic" refers to a natural or synthetic inorganic, non-metallic, polycrystalline material. Ceramic materials are characterized by relatively high hardness, high melting point, low thermal expansion, good chemical resistance, and a brittleness which can lead to fractures unless the material is toughened by reinforcing agents or by other means. The ionic and covalent bonds of ceramics are responsible for many unique properties of these materials, such as high hardness, high melting points, low thermal expansion, and good chemical resistance, but also for some undesirable characteristics, foremost being brittleness.

The term "ceramifiable" means capable of being thermally converted (i.e., by heating) into a ceramified material, The term "ceramified" refers to a material comprising at least 40 percent by weight (in some embodiments, at least 50 percent by weight, at least 60 percent by weight, at least 70 percent by weight, at least 80 percent by weight, at least 90 percent by weight, at least 99 percent by weight, or even 100 percent by weight) of ceramic crystals (i.e., ceramic crystalline phase), but which may or may not be a monolithic material. For example, in some instances ceramified material may be composed of ceramic particles and/or fibers.

The term "ASTM" refers to ASTM International, West Conshohocken, Pennsylvania.

Features and advantages of the present disclosure will be further understood upon consideration of the detailed description as well as the appended claims.

BRIEF DESCRIPTION OF THE DRAWINGS

FIG. 1 is a schematic side view of an exemplary ceramifiable article according to the present disclosure.

It should be understood that numerous other modifications and embodiments can be devised by those skilled in the art, which fall within the scope and spirit of the principles of the disclosure. FIG. 1 may not be drawn to scale.

DETAILED DESCRIPTION

Ceramifiable compositions according to the present disclosure comprise a crosslinked silicone matrix retaining stabilizing components.

The term "silicone" refers to any of a diverse class of fluids, resins, or elastomers based on polymerized siloxanes, substances whose molecules contain chains of alternating silicon and oxygen atoms, wherein each silicon atom is further bonded to two additional groups. Examples of such groups may include H, alkyl (e.g., methyl or ethyl), halogenated alkyl, alkenyl (e.g., vinyl, allyl), phenyl, halogenated phenyl, alkoxy (e.g., methoxy or ethoxy), hydroxyl, acyloxy (e.g., acetoxy), and divalent crosslinking groups that connect two chains of alternating silicon and oxygen atoms. Of these, methyl is typically the predominant group.

The crosslinked silicone matrix may be formed by crosslinking a crosslinkable silicone composition. The crosslinkable silicone may be crosslinked by an appropriate crosslinking mechanism such as, for example, moisture curing, peroxide curing, or high energy radiation (e.g., electron beam radiation or gamma radiation). In one embodiment, a two-part silicone curable silicone may be used such as, for example, a combination of a polyvinyl-substituted silicone with a polyhydrosilicone in the presence of a hydrosilylation catalyst (e.g., as in an RTV silicone). In another embodiment, the crosslinkable silicone may be a silicone having a plurality of free-radically polymerizable groups (e.g., vinyl, allyl, or acryloyl groups) in combination a thermally or photolytically activated free-radical initiator. In yet another embodiment, the crosslinkable silicone may be a silicone having a plurality of hydrolyzable groups that can form crosslinks in the presence of moisture or an acidic catalyst. Further details concerning such crosslinkable systems are well known in the art and are described, for example, by S. C. Shit et al. in "A Review on Silicone Rubber", National Academy of Science Letters (2013), 36(4), pages 355-365, the disclosure of which is incorporated herein by reference.

Many curable (i.e., crosslinkable) silicones (e.g., moisture-curable silicones, platinum-curable silicones, UV-curable silicones, peroxide-curable silicones) suitable for preparing the crosslinked silicone matrix are commercially available from suppliers such as, for example, Elkem Silicones, East Brunswick, New Jersey and Momentive Performance Materials, Waterford, New York.

In some preferred embodiments, the crosslinked silicone matrix is formed by exposing a silicone fluid (e.g., a polydimethylsiloxane fluid), optionally containing an MQ tackifying resin, to electron beam or gamma radiation. The silicone fluid may optional be functionalized with one or more groups as described hereinabove. Useful silicone fluids may have a number average molecular weight (Mn) of 30000 to 1000000 grams/mole, often 50000 to 500000 grams/mole or even 60000 to 300000 grams/mole, although higher and lower molecular weights may also be used.

Appropriate conditions and procedures for e-beam crosslinking silicones is described, for example, in U.S. Pat. No. 9,359,529 (Liu et al.), the disclosure of which is incorporated herein by reference.

Appropriate conditions and procedures for gamma ray crosslinking of silicones are known and described, for example, by Palsule et al. in "Gamma Irradiation of Silicones", Journal of Inorganic and Organometallic Polymers and Materials (2008), 18, pages 207-221, the disclosure of which is incorporated herein by reference.

The crosslinked silicone matrix is typically continuous, however minor discontinuities (e.g., due to manufacturing irregularities) are permissible.

The stabilizing components comprise subcomponents a), b), and c).

Subcomponent a) comprises at least one of an aluminosilicate clay, aluminum oxide, or a hydrate thereof. Exemplary aluminosilicate clays include halloysite, illite, kaolinite, montmorillonite, pyrophyllite, mica, vermiculite, and combinations thereof. Exemplary micas include lepidolite, biotite, phlogopite, muscovite, and combinations thereof. Exemplary aluminum oxides (i.e., aluminas) include amorphous and crystalline aluminum oxides (e.g., η-, γ-, δ-, θ-, or α-alumina). Exemplary hydrates of aluminum oxide include boehmite (i.e., γ-AlO(OH)) and trihydroxyaluminum (also known as alumina hydrate).

In some embodiments, subcomponent a) comprises from 45 to 70, 45 to 55, or 50 to 60 weight percent of a), b) and c) combined.

Subcomponent b) comprises at least one of phosphorus pentoxide, a polyphosphate, an inorganic phosphate salt, boron oxide, boric acid, a boric acid salt, or a hydrate thereof.

Polyphosphates are salts or esters of polyphosphoric acid. Examples include monosodium diphosphate, disodium diphosphate, trisodium diphosphate, tetrasodium diphosphate, Graham's salt, Kurrol's salt, Maddrell's salt, sodium polyphosphate, potassium polyphosphate, sodium calcium polyphosphate, calcium polyphosphate, sodium hexametaphosphate, sodium metaphosphate, monosodium phosphate, disodium phosphate, and potassium phosphate. In typical embodiments, the polyphosphates are inorganic, although organic cations may be included if desired. Exemplary inorganic phosphate salts include alkali or alkaline earth metal phosphates such as sodium phosphate, potassium phosphate, lithium phosphate, cesium phosphate, magnesium phosphate, calcium phosphate, strontium phosphate, ammonium phosphate, and barium phosphate. Exemplary salts of boric acid include lithium borate, sodium borate, potassium borate, cesium borate, magnesium borate, calcium borate, ammonium borate, Exemplary hydrates of boric acid salts include sodium tetraborate decahydrate and sodium borate decahydrate (i.e., borax).

In some embodiments, subcomponent b) comprises from 5 to 40, 10 to 40, 20 to 40, 30 to 40, 5 to 30, 5 to 20, 5 to 15, 10 to 35, or 15 to 25 weight percent of subcomponents a), b) and c) combined.

Subcomponent c) comprises at least one of an alkaline earth oxide, alkaline earth carbonate, or a hydrate thereof. Examples include calcium oxide, calcium hydroxide, magnesium oxide, magnesium hydroxide, strontium oxide, strontium hydroxide, barium oxide, barium hydroxide, magnesium carbonate, calcium carbonate (e.g., calcite or aragonite), monohydrocalcite, and ikaite.

Heating the ceramifiable composition to a temperature between 600 and 1600° C., inclusive, results in a ceramified composition as defined hereinabove. In some embodiments, the temperature is in a range of from 700 to 1600° C., 800 to 1600° C., 900 to 1600° C., or even 1000 to 1600° C. In other embodiments, the temperature is in a range of from 600 to 1500° C., 600 to 1400° C., 600 to 1300° C., or even 600 to 1200° C.

In some embodiments, subcomponents b) and c) melt and/or react at a temperature of 700 degrees or less, or even 600 degrees or less.

In many embodiments, subcomponents a), b), and c) collectively comprise 30 to 90 percent of the ceramifiable composition. In some embodiments, subcomponent c) comprises from to 40, 10 to 30, 10 to 20, 20 to 30, or 20 to 40 weight percent of subcomponents a), b) and c) combined.

In any case, the total of subcomponents a), b), and c) should add up to 100 weight percent, based solely on subcomponents a), b) and c).

If desired, ceramifiable compositions according to the present disclosure may include one or more fillers, preferably inorganic fillers, such as for example, glass fibers, ceramic fibers (e.g., basalt fibers), hollow glass microspheres, hollow ceramic microspheres, perlite, zeolite, and combinations thereof. Organic filler(s) may be included, but due to their combustibility, their content is typically limited to less than 20 weight percent, less than 20 percent. Typical combined total amounts of the aforementioned fillers range from 20 to 80 weight percent, 40 to 80 weight percent, or even 60 to 80 weight percent based on the total weight of the ceramifiable composition; however, other amounts may also be used.

If desired, ceramifiable compositions according to the present disclosure may have neutral acidity (basicity) by choosing balanced amount of acidic component b) and basic component c).

Ceramifiable compositions and ceramifiable articles according to the present disclosure can be made by a multistep process in which a crosslinkable silicone is combined with other components (e.g., subcomponents a), b) and c)) and blended/mixed by any suitable technique (e.g., by mechanical blending or by hand blending) At this point, the resultant mixture is often disposed as a layer (e.g., by extrusion) on a carrier (e.g., which may be temporary or permanently affixed) to facilitate handling during manufacture. If extruded, the mixture can be extruded through a slot or profile die, for example. Next, the crosslinkable silicone is crosslinked by an appropriate crosslinking mechanism such as, for example, addition curing, moisture curing, peroxide curing, or high energy radiation (e.g., electron beam radiation or gamma radiation). The carrier may be separated from the ceramifiable composition at this or a later point, if desired. In some preferred embodiments, a mixture of the crosslinkable silicone, subcomponents a), b), and c), and any additional desired components is disposed on a carrier (e.g., a releasable liner). Exemplary carriers include screens and meshes, polymer films and belts, all optionally treated with a release agent.

In some cases, solvent may be included to reduce viscosity of the mixture if coating it onto the carrier, however, solventless coating processes are preferred. Examples may include roll coating, gravure coating, knife coating, bar coating, die coating, and slot coating. In some preferred embodiments, mixing is carried out in a heated extruder which then produces a film disposed onto a carrier, which then is subjected to a crosslinking treatment (e.g., heat, UV-radiation, electron beam, or gamma radiation) to form the ceramifiable composition. If using viscous curable silicones elevated temperatures in the extruder are often preferred (unless thermal crosslinking is being used).

Referring now to FIG. 1, a ceramifiable article 100 comprises a layer 110 of a ceramifiable composition 120. Layer 110 has first and second opposed major surfaces (112, 114). Optional pressure-sensitive adhesive elements (132, 134) are disposed on first or second major surfaces (112, 114), respectively. Optional releasable liners (142, 144) are releasably adhered to respective optional pressure-sensitive adhesive elements (132, 134).

Forming a layer of the ceramifiable composition may be carried out by any suitable technique, such as, for example, by passing the ceramifiable composition through a roll gap, pressing, knife coating, bar coating and slot coating, preferably before crosslinking the crosslinkable silicone, although this is not a requirement.

Pressure-sensitive adhesives (PSAs) are well known and widely available. Examples include acrylic PSAs and silicone PSAs. Suitable releasable liners for pressure-sensitive adhesives, which typically vary depending on the composition of the PSA, may include, for example, silicone-treated papers and films and fluorosilicone-treated papers or films.

Ceramifiable compositions according to the present disclosure may have any content (e.g., 1 to 50 weight percent, 5 to 50 weight percent, or even 10 to 50 weight percent) of the crosslinked silicone matrix that is capable of retaining the other components of the ceramifiable composition. In some embodiments, the crosslinked silicone matrix content may be less than 50 weight percent, less than 40 weight percent, less than 30 weight percent, less than weight 20 percent or even less than 10 percent, based on the total weight of the ceramifiable composition.

When heated sufficiently (e.g., to a temperature in the range of 600 to 1500° C.) ceramifiable articles and compositions according to the present disclosure form corresponding ceramified articles and compositions. Advantageously, ceramifiable articles according to the present disclosure often substantially retain their shape when ceramified due to formation of ceramic crystals.

Preferably, ceramified articles and compositions according to the present disclosure may contain less than or equal to 5 weight percent of (preferably less than or equal to 2 weight percent of, more preferably less than or equal to 1 weight percent of, or even free of) organic carbon.

Preferably, the ceramifiable articles and compositions according to the present disclosure have a percent elongation at break according to ASTM test method D882-18 (2018) entitled "Standard Test Method for Tensile Properties of Thin Plastic Sheeting" of at least 30 percent.

Preferably, ceramified articles and compositions according to the present disclosure have a compressive strength according to ASTM test method C1424-15(2015) entitled "Standard Test Method for Monotonic Compressive Strength of Advanced Ceramics at Ambient Temperature of at least 5 kilopascals.

Ceramifiable compositions according to the present disclosure are useful, for example, as fire stop materials for use in airplanes, vehicle battery packs, cable sheaths, and other applications where such materials are commonly used.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Table 1, below, reports materials used in the Examples.

D882-18 (2018). The test specimens were conditioned for 24 hours at 25° C. and 50% relative humidity. The test was performed using a Instron 6800 Peel tester (Instron 6800, from Norwood, Massachusetts). The crosslinked ceramifiable specimens used were 1 inch (2.54 cm) wide and 6 inches (15.2 cm) in length. The initial jaw separation of 4 inches and a crosshead speed of 12 inches/minute were used. The test specimens were stretched until breakage occurred. Three samples were tested for each specimen and average percent elongation at break was reported.

Change in Linear Dimension after Fast Firing

The change in linear dimensions was determined by measuring the length of the specimen before firing and upon cooling after being subjected to the fast-firing conditions. An expansion of the specimen caused by firing was reported as a positive change in linear dimension and a contraction (shrinkage) as a negative change in linear dimension.

TABLE 1

| MATERIAL | DESCRIPTION AND SOURCE |
| --- | --- |
| VS165K | Polydimethylsiloxane, obtained as ANDISIL VS 165000 from Andisil, Waukegan, Illinois |
| R8200 | Fumed silica, obtained as AEROSIL R8200 from Evonik, Essen, Germany |
| Poly Microspheres | Polymer microspheres, obtained as product number E65-135D from Chase Corporation, Westwood, Massachusetts |
| 1,4-butanediol | Obtained as product number 493732 from Millipore Sigma, St. Louis, Missouri |
| Halloysite | Aluminosilicate clay mineral, obtained as DRAGONITE HP from Applied Minerals, Brooklyn, New York |
| ADT 1002 | Expanded graphite, obtained as product number ADT 1002 from ADT Carbonic Materials, Shijiazhuang, China |
| ADT 35 | Expanded graphite, obtained as product number ADT 35 from ADT Carbonic Materials, Shijiazhuang, China |
| Glass Microspheres | Obtained as 3M Glass Bubbles K15 from 3M Company, St. Paul, Minnesota |
| MgO | Magnesium oxide, obtained as ZEROGEN 100SP from Huber Engineered Materials, Atlanta, Georgia |
| APHOS | A long-chain ammonium phosphate phase II, obtained as FR CROS 486 from Budenheim, Mansfield, Ohio |
| L1 | Release liner, polyester film containing a perfluorinated melt additive |
| DOWSIL | Silicone foam kit part A, obtained as DOWSIL 3-8209 from Dow Chemical Company, Midland, Michigan |
| BLUESIL 3242 | RT silicone foam kit part A, obtained as BLUESIL 3242 from Elkem, Oslo, Norway |
| BLUESIL 3230 | RT silicone foam kit part A, obtained as BLUESIL 3230 from Elkem |
| DMS-S45 | Silanol terminated polydimethylsiloxane, obtained as DMS-S45 from Gelest, Morrisville, Pennsylvania |
| DMS -S51 | Silanol terminated polydimethylsiloxane, obtained as DMS-S51 from Gelest, Morrisville, Pennsylvania |
| KAMIN 70C | Calcined kaolin clay, obtained as KAMIN 70C from KaMin Performance Minerals, Macon, Georgia |
| AK1000K | A linear, polydimethylsiloxane with a viscosity of approximately 1000000 $mm^2$/second, obtained as WACKER AK 1000000 from Wacker Chemical Corporation, Adrian, Michigan |
| Glass Fabric | 5 mil (25.4 microns) woven fiberglass fabric from JPS Composite Materials, Anderson, South Carolina |
| Flat Mica | Mica obtained as SE MICA 200from CB Minerals |
| Vermiculite | Vermiculite obtained as screened particles at 0.3 to 0.8 mm from 3M CG |

Test Methods

Fast Firing Test (FFT)

Test specimens were placed in a pre-heated furnace at certain temperature (e.g., 500~1000° C.) and maintained at that temperature for certain time period (2 to 20 minutes), as specified.

If the specimen caught fire a "yes" was recorded; if not, a "no" was recorded.

Percent Elongation at Break

Percent Elongation at Break was measured in % (percent elongation when break occurs) by in accordance with ASTM Compression Resistance A cylindrical 500 g stainless steel weight with a 1 inch (2.54 cm) diameter contact surface (~5 kilopascals pressure) was gently placed onto a ceramified sample after fast firing test and cooled down to room temperature. If the specimen broke, a "fail" was recorded; if not, a "pass" was recorded.

Surface Tack

Tack was measured using a TA-XT Plus Texture Analyzer (Stable Micro Systems Ltd., Surrey, United Kingdom) equipped with a 6 mm diameter polypropylene cylinder probe. A cured ceramifiable test specimen was slit to a width of 1.9 cm (0.75 inches) and length of 10.2 cm (4.00 inches) and laminated to a brass bar with 10 millimeter diameter holes through it to allow for the probe to reach the surface of test specimen. Test parameters were: Pretest: 0.5 millimeters/second; test speed: 1.0 millimeters/second; post test speed: 10.0 millimeters/second; applied force: 100 grams; contact time: 5 seconds; trigger force: 1 gram; and withdraw distance: 3 millimeters. Tack was measured and reported in grams.

Amorphous Phase Percentage

Power XRD reflection geometry data were collected in the form of a survey scan by use of a PANalytical Empyrean vertical diffractometer, The instrument was calibration with NIST standard, SRM 660b. Line focus copper $K_\alpha$ radiation, and PIXcel 3D detector registry of the scattered radiation. The diffractometer was fitted with 0.04 rad Sollers, programmable divergence slit with 5.0 mm irradiation length, reflect-transmission stage, programmable receiving slit with 2.0 mm height, programmable anti-scatter slit with 2.0 mm observed length and nickel filter. The detector was set at 1D mode with 255 active channels (3.35°). The sample was ground before loaded to zero background silicon sample holder. The survey scan was conducted from 5 to 80 degrees using a 0.04 degree step size and 1200-second dwell time setting. The radius of measurement center is 240 mm. X-ray generator settings of 40 kV and 40 mA were employed. X-ray diffraction (XRD) peak intensity was evaluated by Profile fitting with Jada Pro. After loading the file, a background was defined. All the scattering peaks above the background were fit. The peaks with Full Width at Half Maximum (FWHM) larger than 4° (2 theta) were assigned to amorphous phase. The ratio of amorphous phase peak area divided by total peak area expressed as a percentage is reported as "amorphous phase percentage".

Elemental Analysis

Prior to data collection, a portion of each as-received sample was placed directly into a 31 mm pellet die set, the die set subsequently placed into an automatic hydraulic press, and each sample portion pressed into pellet form using a pressure of twenty tons per square inch (276 MPa) for a three minute duration. Each resulting pressed pellet was then placed directly into a stainless steel XRF sample holder and analyzed for most of the elements in the periodic table (from carbon to uranium inclusive) using a Rigaku Primus II wavelength dispersive X-ray fluorescence spectrometer equipped with a rhodium X-ray source, a vacuum atmosphere, and a 20 mm diameter measurement area. One aliquot was prepared from each as-received sample, each aliquot was analyzed three times, and an average and deviation was calculated and reported for each element detected.

Torch and Grit Test (TGT)

Samples were nominally 102×102 mm in size. The sample was positioned 60 mm (2.375 inches) from the nozzle of a Champion Bench hydrogen torch burner obtained from Bethlehem Apparatus Company Inc, of Hellertown, Pennsylvania. A thermocouple (TCO) was positioned 25 mm (1.0 inches) from the nozzle of the burner. A blaster gun was loaded with 120 grit aluminum oxide non-shaped media and aligned with the nozzle of the torch at the same distance (60 mm) from the sample. The torch of the Champion Bench Burner was adjusted to 1200° C. The media blaster gun was then triggered at 241.3 kPa (35 psi). A sample was exposed to a maximum of 12 blast cycles each lasting 20 seconds with 10 seconds of active blast time and 10 seconds of inactive blast time in the center of the sample. Sample testing was stopped if a hole was burned through the test specimen to the opposite side, or if mounted on an aluminum plate, if a hole was blasted through to the aluminum. The Torch and Grit Test used in these experiments is a modified version of the Torch and Grit Test described in WO 2021/144758 A1 and incorporated herein by reference.

Comparative Example CE-1

DMS-S51 (100 grams (g)) was coated between two L1 liners using a knife coater with 20 mil (0.51 mm) gap and cured by e-beam radiation with 300 kiloelectron volts (keV) and 8 megarads (Mrad) from both sides.

Comparative Example CE-2

BLUESIL 3230 (100 g) was coated between two L1 liners using a knife coater with a 20 mil (0.51 mm) gap and cured by e-beam radiation with 300 keV and 8 Mrad from both sides.

Comparative Example CE-3

DOWSIL 3-8209 (100 g) and 4 g of K15 was mixed together using a high speed mixer. The mixture was coated between two L1 liners with 20 mil gap through a knife coater and cured by e-beam radiation with 300 keV and 8 Mrad from both sides.

Comparative Example CE-4

BLUESIL 3242 (100 g) was coated between two L1 liners using a knife coater with a 20 mil (0.51 mm) gap and cured by e-beam radiation with 300 keV and 8 Mrad from both sides.

Comparative Example CE-5

DMS-S45 (100 g) and 60 g of MQ were mixed together using a high speed mixer, The mixture was hot pressed at 93° C. between two pieces of 5 mil (0.13 mm) glass fabric with a 56 mil (1.42 mm) overall thickness and cured by e-beam radiation with 300 keV and 16 Mrad from both sides.

Example EX-1

DMS-S51 (100 g), 50 g of Halloysite, 25 g of MgO, and 25 g of APHOS were mixed together using a high speed mixer. The mixture was coated between two L1 liners using a knife coater with a 20 mil (0.51 mm) gap and cured by e-beam radiation with 300 keV and 15 Mrad from both sides.

Example EX-2

BLUESIL 3230 (100 g), 4 g of glass microspheres, 2 g of 1,4-butanediol, 50 g of halloysite, 25 g of MgO, and 25 g of APHOS were mixed together using a high speed mixer. The mixture was heated and coated at 70° C. between two L1 liners using a knife coater with a 20 mil (0.51 mm) gap and cured by e-beam radiation with 300 keV and 15 Mrad from both sides.

Example EX-3

DOWSIL (100 g), 4 g of glass microspheres, 2 g of 1,4-butanediol, 50 g of halloysite, 25 g of MgO, and 25 g of APHOS were mixed together using a high speed mixer. The mixture was hot pressed at 93° C. with a 30 mil (0.76 mm) overall thickness between two L1 liners through a knife coater and cured by electron beam (e-beam) radiation using 300 keV and 6 Mrad from both sides.

Example EX-4

BLUESIL 3242 (100 g), 4 g of glass microspheres, 2 g of 1,4-butanediol, 50 g of halloysite, 25 g of MgO, and 25 g of APHOS were mixed by high speed mixer. The mixture was heated and coated at 70° C. between two L1 liners using a knife coater with a 20 mil (0.51 mm) gap and cured by e-beam radiation with 300 keV and 15 Mrad from both sides.

Example EX-5

DMS-S45 (80 g), 80 g of halloysite, 20 g of MgO, and 20 g of APHOS were mixed by high speed mixer. The mixture was hot pressed at 93° C. between two pieces of 5 mil (0.13 mm) glass fabric with a 46 mil (1.17 mm) overall thickness and cured by e-beam radiation with 300 keV and 16 Mrad from both sides.

Example EX-6

DMS-S45 (80 g), 80 g of KAMIN 70C, 20 g of MgO, and 20 g of APHOS were mixed by high speed mixer. The mixture was hot pressed at 93° C. between two pieces of 5 mil (0.13 mm) glass fabric with a 46 mil (1.17 mm) overall thickness, and cured by e-beam radiation with 300 keV and 16 Mrad from both sides.

Example EX-7

DMS-S45 (80 g), 80 g of KAMIN 70C, 20 g of MgO, and 20 g of APHOS were mixed by high speed mixer. The mixture was hot pressed at 93° C. between two pieces of 5 mil (0.13 mm) glass fabric with a 13 mil (0.33 mm) overall thickness making a 3-layer construction. A second 3-layer construction was made, and additional mixture was hot pressed between the two 3-layer constructions with a 46 mil (1.17 mm) overall thickness, making a 7-layer construction. The 7-layer construction was cured by e-beam radiation with 300 keV and 8 Mrad from both sides.

Example EX-8

AK1000K (32 g), 16 g of halloysite, 16 g of MgO, and 16 g of APHOS were mixed by Brabender mixer (C. W. Brabender Instruments, Inc., South Hackensack, New Jersey) at 93° C. The mixture was hot pressed at 93° C. between two pieces of 5 mil (0.13 mm) glass fabric with a 46 mil (1.17 mm) overall thickness and cured by e-beam radiation with 300 keV and 8 Mrad from both sides.

Example EX-9

AK1000K (21 g), 21 g of halloysite, 14 g of MgO, and 14 g of APHOS were mixed using a Brabender mixer at 93° C. The mixture was hot pressed at 93° C. between two pieces of 5 mil (0.13 mm) glass fabric with a 46 mil (1.17 mm) overall thickness and cured by e-beam radiation with 300 keV and 8 Mrad from both sides.

Example EX-10

AK1000K (14 g), 28 g of halloysite, 14 g of MgO, and 14 g of APHOS were mixed using a Brabender mixer at 93° C. The mixture was hot pressed at 93° C. between two pieces of 5 mil (0.13 mm) glass fabric with a 46 mil (1.17 mm) overall thickness and cured by e-beam radiation with 300 keV and 8 Mrad from both sides.

Example EX-11

AK1000K (20 g), 8 g of halloysite, 10 g of MgO, 10 g of APHOS, and 2 g of glass microspheres were mixed by Brabender mixer at 93° C. The mixture was hot pressed at 93° C. between two pieces of 5 mil (0.13 mm) glass fabric with a 46 mil (1.17 mm) overall thickness and cured by e-beam radiation with 300 keV and 8 Mrad from both sides.

Example EX-12

AK1000K (21 g), 21 g of flat mica, 14 g of MgO, and 14 g of APHOS were mixed by Brabender mixer at 93° C. The mixture was hot pressed at 93° C. between two pieces of 5 mil glass fabric with a 46 mil (1.17 mm) overall thickness, and cured by e-beam radiation with 300 keV and 8 Mrad from both sides.

Example EX-13

AK1000K (21 g), 21 g of vermiculite, 14 g of MgO, and 14 g of APHOS were mixed by Brabender mixer at 93° C. The mixture was hot pressed at 93° C. between two pieces of 5 mil (0.13 mm) glass fabric with a 46 mil (1.17 mm) overall thickness, and cured by e-beam radiation with 300 keV and 8 Mrad from both sides.

Example EX-14

AK1000K (21 g), 21 g vermiculite, 14 g of MgO, 14 g of APHOS, and 2 g of glass microspheres were mixed by Brabender mixer at 93° C. The mixture was hot pressed at 93° C. between two pieces of 5 mil (0.13 mm) glass fabric with a 46 mil (1.17 mm) overall thickness and cured by e-beam radiation with 300 keV and 8 Mrad from both sides.

Table 2, below, reports various test results for Comparative Examples CE-1 to CE-6 and Table 3 for Examples EX-1 to EX-6.

TABLE 2

|  | TEST | CE-1 | CE-2 | CE-3 | CE-4 | CE-5 |
|---|---|---|---|---|---|---|
| TEST OF CERAMIFIABLE COMPOSITION | Surface Tack | no | slightly | slightly | slightly | tacky |
|  | Percent Elongation at break | >50% | >50% | >50% | >50% | >50% |
|  | Flexibility | excellent | excellent | excellent | excellent | viscoelastic |
| TEST AFTER FAST FIRING (FFC) | FFT | Yes (2 min @ 500° C.) ashes | Yes (3 min @ 600° C.) ashes | Yes (3 min @ 600° C.) ashes | Yes (3 min @ 600° C.) ashes | Yes (3 min @ 600° C.) — |
|  | % Change in Linear Dimensions | (2 min @ 500° C.) | (3 min @ 600° C.) | (3 min @ 600° C.) | (3 min @ 600° C.) |  |

TABLE 2-continued

| TEST | CE-1 | CE-2 | CE-3 | CE-4 | CE-5 |
|---|---|---|---|---|---|
| Compression Resistance | failed (2 min @ 500° C.) | failed (3 min @ 600° C.) | failed (3 min @ 600° C.) | failed (3 min @ 600° C.) | — |
| % Residual Mass | 24 (2 min @ 500° C.) | 37 (3 min @ 600° C.) | 47 (3 min @ 600° C.) | 57 (3 min @ 600° C.) | — |
| % Atomic Composition | — | C(2)/O(50)/Si(48) | — | — | — |
| Amorphous Phase Percentage | — | 100 | 38 | 92 | — |
| TGT | — | — | — | — | 1 |

TABLE 3

| | TEST | EX-1 | EX-2 | EX-3 | EX-4 | EX-5 | EX-6 |
|---|---|---|---|---|---|---|---|
| TEST OF CERAMIFIABLE COMPOSITION | Surface Tack | no | no | no | no | — | — |
| | Percent Elongation at Break | >100% | >75% | >75% | >75% | — | — |
| | Flexibility | excellent | excellent | excellent | excellent | good | good |
| TEST AFTER FAST FIRING (FFC) | FFT | No (5 min @ 600° C.) | No (15 min @ 800° C.) | No (15 min @ 900° C.) | No (15 min @ 800° C.) | — | — |
| | % Change in Linear Dimensions | −2 (5 min @ 600° C.) | −5 (15 min @ 100° C.) | −4 (15 min @ 100° C.) | −7 (15 min @ 1000° C.) | — | — |
| | Compression Resistance | pass (5 min @ 600° C.) | pass (15 min @ 1000° C.) | pass (15 min @ 1000° C.) | pass (15 min @ 1000° C.) | — | — |
| | % Residual Mass | 54 (5 min @ 600° C.) | 53 (15 min @ 1000° C.) | 55 (15 min @ 1000° C.) | 50 (15 min @ 1000° C.) | — | — |
| | % Atomic Composition | — | C(2)/O(48)/Si(22)/Mg(12)/Al(8)/P(8) | C(1)/O(48)/Si(20)/Mg(14)/Al(7)/Ca(2)/P(8) | C(2)/O(48)/Si(22)/Mg(11)/Al(8)/Ca(1)/P(8) | — | — |
| | Amorphous Phase Percentage | — | 40 | 28 | 34 | — | — |
| | TGT | — | — | — | — | 3 | 3 |

All cited references, patents, and patent applications in this application that are incorporated by reference, are incorporated in a consistent manner. In the event of inconsistencies or contradictions between portions of the incorporated references and this application, the information in this application shall control.

The preceding description, given in order to enable one of ordinary skill in the art to practice the claimed disclosure, is not to be construed as limiting the scope of the disclosure, which is defined by the claims and all equivalents thereto.

What is claimed is:

1. A ceramifiable composition comprising a crosslinked silicone matrix retaining stabilizing components, wherein the stabilizing components comprise subcomponents:
   a) at least one of an aluminosilicate clay, aluminum oxide, or a hydrate thereof;
   b) at least one of phosphorus pentoxide, a polyphosphate, an inorganic phosphate salt, boron oxide, boric acid or a salt thereof; and
   c) at least one of an alkaline earth oxide, alkaline earth carbonate, or a hydrate thereof, and wherein heating the ceramifiable composition to a temperature between 600 and 1600 degrees Celsius, inclusive, results in a ceramified composition.

2. The ceramifiable composition of claim 1, wherein the subcomponents b) and c) melt at a temperature of 700 degrees or less.

3. The ceramifiable composition of claim 1, wherein the subcomponents a), b), and c) collectively comprise 30 to 90 percent of the ceramifiable composition.

4. The ceramifiable composition of claim 1, wherein subcomponent a) comprises from 45 to 70 weight percent of the total weight of a), b) and c).

5. The ceramifiable composition of claim 1, wherein subcomponent b) comprises from 5 to 40 weight percent of the total weight of subcomponents a), b) and c).

6. The ceramifiable composition of claim 1, wherein subcomponent c) comprises from 5 to 40 weight percent of the total weight of subcomponents a), b) and c).

7. The ceramifiable composition of claim 1, wherein subcomponent a) comprises halloysite.

8. The ceramifiable composition of claim 1, wherein subcomponent b) comprises at least one of phosphorus pentoxide, a polyphosphate, or an inorganic phosphate salt.

9. The ceramifiable composition of claim 8, wherein subcomponent b) comprises phosphorus pentoxide.

10. The ceramifiable composition of claim 1, wherein subcomponent c) comprises magnesium oxide or magnesium hydroxide.

11. The ceramifiable composition of claim 10, wherein subcomponent c) comprises magnesium hydroxide.

12. The ceramifiable composition of claim 1, further comprising at least one of hollow glass microsphere or hollow ceramic microspheres.

13. The ceramifiable composition of claim 1, wherein the crosslinked silicone matrix is crosslinked at least in part by exposure to electron beam or gamma radiation.

14. The ceramifiable composition of claim 13, wherein the crosslinked silicone matrix is crosslinked at least in part by exposure to electron beam.

15. The ceramifiable composition of claim 1, wherein the ceramified composition contains less than or equal to 5 weight percent of organic carbon.

16. A ceramifiable article comprising a layer of the ceramifiable composition of claim 1, wherein the layer has first and second opposed major surfaces.

17. The ceramifiable article of claim 16, further comprising at least one pressure-sensitive adhesive element disposed on at least one of the first or second major surfaces.

18. The ceramifiable article of claim 17, wherein the at least one pressure-sensitive adhesive element comprises a silicone-based pressure-sensitive adhesive.

19. The ceramifiable article of claim 16, wherein the ceramifiable composition has a percent elongation at break according to ASTM test method D882-18 (2018) of at least 30 percent.

20. The ceramifiable article of claim 16, wherein the ceramified composition has a compressive strength according to ASTM test method C1424-15 (2015) of at least 5 kilopascals.

* * * * *